Feb. 7, 1939.                D. P. LAVIETES              2,145,883
                   SMOKING PIPE AND METHOD OF MAKING SAME
                              Filed May 14, 1936
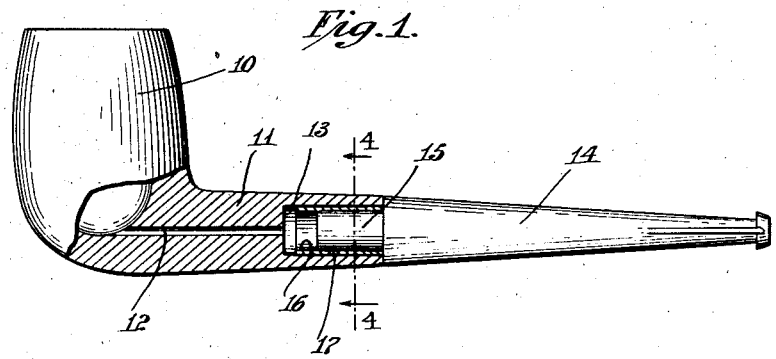
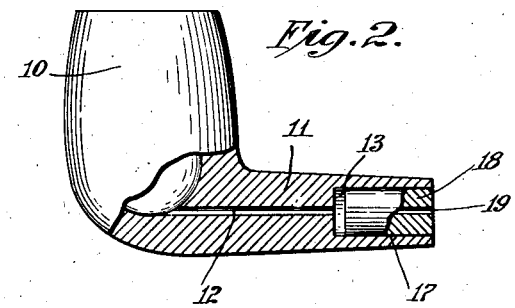
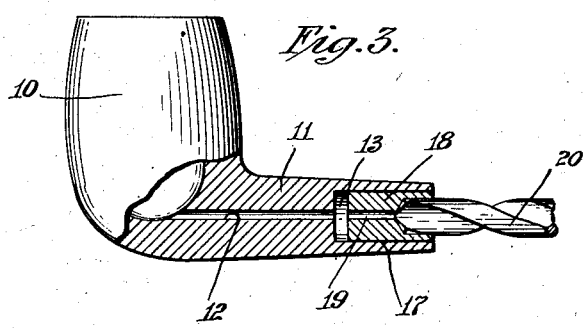 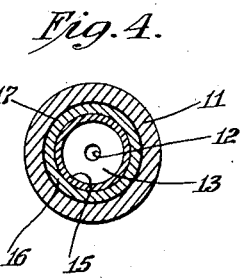
David P. Lavietes
INVENTOR
ATTORNEY.

Patented Feb. 7, 1939

2,145,883

UNITED STATES PATENT OFFICE 2,145,883

SMOKING PIPE AND METHOD OF MAKING SAME

David P. Lavietes, Brooklyn, N. Y.

Application May 14, 1936, Serial No. 79,663

6 Claims. (Cl. 131—172)

The invention relates to smoking pipes and the method of making same, and more particularly to a pipe in which the bit is removably secured to the shank of the bowl by a socket and tenon connection, and to the method or practice followed in producing a laminated or veneered socket portion of the shank of the pipe.

In smoking pipes, the bowls and their shanks are generally made of one material and the bit of another material. The bit in one type of pipe is secured to the shank by means of a tenon carried thereby having a close fit with a socket in the shank. The tenon and socket must be fitted with extreme accuracy to form a tight joint between the parts, and yet the construction of these parts must be such as to permit ease in the separation of the bit from the shank preparatory to cleaning the pipe. The material of the shank and of the bit is not only subjected to heat and moisture while a pipe is in use, thus causing expansion and contraction of the material, but when a pipe is in stock the material is also subject to shrinkage and expansion.

With the use of different materials in the shank and in the bit, the coefficients of expansion and contraction differ in the different materials, and it is practically impossible to allow a tolerance in the dimensions of the tenon and of the socket in the shank which will accommodate these parts to varying diameters and yet secure the necessary tight fit of the parts. Furthermore, this condition results in a frequent cracking of shanks, or in breakage of the shanks due to the exertion of excessive energy when removing or inserting the tenon in the socket because of the binding of the tenon in the shank, or of an improper fit of the tenon and the socket due to expansion of the material of either or both of these parts, after a bit has been removed from the shank.

At the present time, pipes having a metal tenon are being extensively produced, and with such pipes the difficulties above referred to are considerably smaller than with pipes having a hard rubber or other composition bit, since said tenons have fixed dimensions, and the difference in the coefficient of expansion between the metal of the tenon and the wood or plastic of which the bowl and shank are made, is less pronounced than with other materials.

It has been attempted to correct this condition by cementing a cork ring within the shank, but because of the manufacturing problems involved in the use of a cork ring, this expedient has not corrected the difficulties.

With the above conditions in mind, I have produced a smoking pipe wherein the socket of the shank is provided with a thin veneer of a highly absorbent, highly compressible material, thus not only securing a tight fit of the tenon in the socket at all times, due to the expansibility of the wall of the socket following the compression thereof when inserting the tenon therein, but protecting the material of the shank from moisture accumulated therein by reason of the absorption of this moisture by the veneer. Furthermore, a shank formed in the manner contemplated by my invention avoids all those difficulties due to changing dimensions of the shank and of the tenon from expansion and contraction of the material thereof, since the compressibility of the portion of the shank engaged by the tenon will compensate for such varying dimensions to an extent to avoid all possibility of the cracking of the material of the shank. This compression also permits the allowance of adequate tolerance in the production of the parts of the pipe to avoid possibility of the binding of the tenon in the socket and yet have a sufficiently tight fit to avoid any looseness of the bit.

In the production of a pipe embodying the invention, I have found it essential to form the veneer in the shank, as distinguished from the securing of a pre-formed ring therein. In this manner it is possible to place the inner lamina of the veneer under compression, and to form a socket directly in the material of which this lamina is formed, thus not only permitting accuracy in the locating of the socket for the tenon, but ensuring uniform thickness throughout the inner lamina of the shank.

By following the method of my invention, the thickness of the wall of the shank ceases to be an important factor, since likelihood of cracking of the material of the shank during the manufacture of a smoking pipe or during its use, because of thinness of the wall of the shank, is practically negligible.

The invention consists primarily in a smoking pipe embodying therein a bowl, a shank therefor having an end socket therein, and a smoke opening extending from said socket to said bowl, the inner wall of said socket being veneered with a thin stratum of a highly compressible and highly absorbent wood bonded to the material of the shank, and a bit having a tenon adapted to enter and engage the veneer stratum within said shank; and in such other novel features and characteristics, and in the novel steps and practices followed in applying the veneering stratum to the socket, all as hereinafter set forth and described, and more particularly pointed out in the claims hereto appended.

Referring to the drawing,

Fig. 1 is a side view, partly broken away, of a smoking pipe embodying the invention;

Fig. 2 is a view of a partly finished bowl and shank with parts broken away;

Fig. 3 is a view of a bowl and its shank, partly broken away, illustrating the final step of veneering the shank socket; and Fig. 4 is a section on the line 4—4 of Fig. 1.

Like numerals refer to like parts throughout the several views.

In the accompanying drawing, which shows an embodiment of the invention in connection with a pipe having a metal tenon, the bowl proper is shown at 10 and its shank at 11. Said bowl and shank may be formed of any of the many materials used for this purpose.

Extending from the bowl through the shank is a smoke opening 12, one end of which communicates with a socket forming countersink 13 adjacent, and opening outwardly of, the end of the shank.

The bit is shown at 14, this bit being provided with the usual smooth tenon 15 by means of which and the socket 13, the bit is connected with the shank. While in the accompanying drawing, the showing is of a bit having a well known type of metal tenon, it is obvious that the bit may be made of any of the well known materials commonly used for this purpose.

The socket opening 13 has an inner veneer 16 composed of a thin stratum of a highly compressible and highly absorbent wood. In actual practice, the lamina 16 is about $\frac{1}{32}$ of an inch in thickness. This veneer is permanently bonded to the shank by any suitable adhesive.

I have secured highly satisfactory results by making the inside diameter of the lamina 16 from .010 to .015 of an inch smaller than the outside diameter of the tenon 15. Expressed in other words, the tenon 15 may be made from .010 to .015 of an inch oversize as compared with the inside diameter of the lamina 16.

While the best results have been secured with the heaviest grade of balsa wood, I have also used bass wood and sugar pine in forming the veneer. The balsa wood and the bass wood are soft, more or less grainless woods which are highly absorbent and readily compressible. Sugar pine, however, has a more decided grain than the other woods, but like them, is highly absorbent and highly compressible. I prefer, however, to use balsa wood of the grade mentioned, this wood being readily obtainable and being easily worked with tools when producing a pipe.

In a pipe constructed as above described, the veneer 16 is readily compressed when inserting the tenon in the socket. This compression of the liner not only facilitates the insertion of the tenon, but holds the bit without possibilty of the development of looseness. All those stresses which might tend to crack the shank, whether from the application of force when inserting the tenon in the socket or from the expansion of the materials, merely serve to compress the veneer or liner 16, thus practically eliminating loss because of cracked stems during manufacture of a pipe, from handling by dealers and while the pipe is in use. The end of the shank and the shoulder upon the bit about the tenon are squared off, so as to permit a close fit at this point, which assists in preventing the development of looseness of the bit.

The absorptiveness of the veneer or liner 16 causes it to take up any moisture of the precipitant which accumulates within the shank socket, thus not only keeping the liner or veneer soft and lubricating it, but preventing discoloration of the shank from the precipitant accumulating therein while the pipe is in use. While the length of the veneer or liner 16 is, as shown, less than the total depth of the socket, this is immaterial, except that it may be undesirable in cases where the pipe construction is such that the exposure of the material of the shank to the precipitant may result in discoloration close to the bowl. In other cases it may be desirable to permit the accumulation of such precipitant to effect the coloring of the lower part of the bowl.

The absorption of moisture by the veneer stratum or liner 16 may cause slight swelling of this stratum, but any variance in dimensions from this cause will be so slight as not to materially affect the conditions above referred to.

The normal tendency of the wood of the veneer stratum 16 to expand after compression ensures a firm grip between the tenon and the wall of the socket, but with the use of the woods described, the tenon nevertheless always has a smooth sliding fit with the shank. Absorption of moisture by the liner does not interfere with, but rather improves, this condition. As a consequence, a bond may be formed between the veneer stratum and the shank having greater strength than the frictional bond between the tenon and the veneer stratum. Consequently, the likelihood of the veneer stratum being drawn from the shank when removing the bit is very remote.

With a cushioning veneer stratum of the character herein described, the stresses to which the shank is subjected with the ordinary socket and tenon connection are practically eliminated, so that this shank may have a very thin wall, if desired.

I have found, in actual practice, that the best results are secured with the use of the heaviest grade of balsa wood in forming the veneered shank, not only because of the superiority of the inherent characteristics of this material for the purpose, but because of the greater ease with which the liner may be applied to the shank by the hereinafter described method.

In producing a pipe embodying the invention, the roughed out bowl and shank, or shumel, is drilled to form the socket 13, and the bowl is hollowed out in the usual manner.

After the final frazing operation, I apply a coating 17 of a suitable adhesive to the outside of a solid cylindrical plug 18 of balsa or other wood to be used in the liner, or to said plug and the inner wall of the socket. Any desired adhesive may be used. A waterproof adhesive, such as sodium silicate, will be found to be effective. This plug has a diameter greater than the inside diameter of the socket 13. I have secured very satisfactory results with an oversize in the plug of .007 of an inch. In forcing the plug into the socket bore, the material of the plug will be compressed and the expansibility of the material of the plug will supply the necessary pressure to secure an effective bond between same and the shank.

After the assembly of the plug in the manner described, the shumel may be set aside for a sufficient time to permit the adhesive to set. Since the thickness of the liner veneer need not exceed ¾₂ of an inch, it is obvious that the subsequent drilling operation to remove the material of the plug to an extent to leave a liner of such a thickness, must be done with considerable care. Preferably, in order to ensure uniform thickness throughout the entire veneer stratum, I first drill a hole 19 which is accurately centered in relation to the plug. This hole may be drilled at the same time as the smoke opening 12 is drilled, although if desired, these openings may be separately made. Thereafter, a hole is drilled longitudinally of the plug by any desired form of drill 20, the opening 19 serving to continuously accurately center the drill in relation to the plug. While a twist drill is shown in the drawing, any other desired form of drill may be employed.

Balsa wood may be more readily drilled than bass wood, sugar pine or other soft woods.

Following the drilling of the plug, the shumel is finished in the usual manner, so that during the veneering operation there is sufficient material in the shank to minimize likelihood of the cracking of the shank during the veneering operation. Since the plug is firmly bonded to the shank during the entire veneering operation, the drill may be readily backed out without likelihood of injury to the veneer stratum, notwithstanding the softness of the material thereof.

In the veneering process, the use of the heaviest grade of balsa wood is preferable. This material may be readily turned to form the plugs. It has little drag upon a drill and has considerable tensile strength, notwithstanding its softness, and an inherent high degree of compressibility.

Following the veneering and frazing operations, the veneering stratum is stained, simultaneously with the staining of the pipe, so that in the finished product the presence of this stratum is not apparent.

In squaring off the end of the shank, the material of the end of the liner may be removed simultaneously with the material of the shank.

With properly designed jigs and tools, it may not be necessary to drill the opening 19.

The inside diameter of the veneer stratum should be as stated above, from .010 to .015 of an inch under the outside diameter of the tenon 15. This permits of a safe tolerance in forming the tenon and avoids the difficulty of fitting tenons to particular sockets.

By following the method of the invention, it is possible to provide a pipe with a stem having a highly compressible and highly absorbent liner veneer which will be of uniform thickness throughout in all pipes, and which will adapt itself to the pre-formed tenons of bits so as to avoid possibility of cracking of the material of the shank during the final assembly operation in producing the pipes.

After completion, and while such pipes are in use, this liner veneer not only permits the bits to be removed from the shank with ease, but will permit the repeated removal and insertion of the tenon in the socket without likelihood of breakage or cracking of the shank, notwithstanding that lack of care in handling more or less delicate objects which is characteristic of the general public.

The liner veneer will not harden or become brittle with age, even when a pipe is not in use, and the shrinkage of the material of the veneer stratum will be immaterial even after a long period of non-use of a pipe.

The plug, when inserted in the socket of the shank, is of well seasoned, dry material. While, with the absorption of moisture thereby, the material may swell, the increased thickness, because of the swelling of the wood, merely ensures of tighter fit between the tenon and the veneer stratum and has a lubricating effect upon said stratum which will compensate for the increased closeness of fit between the tenon in the socket. When inserting the tenon in the socket, the material of the veneer stratum, even though it may be slightly swelled, will be readily compressed by the application of a pressure upon the bit insufficient to crack the shank.

It is not my intention to limit the invention to the precise details of construction, nor to the specific dimensions of parts herein referred to, it being obvious that such may be varied with pipes of different sizes and with the use of different materials in the shanks and bits of said pipes.

Having described the invention, what I claim as new and desire to have protected by Letters Patent, is:—

1. The herein described method of making a smoking pipe consisting in forming a socket opening in the end of the shank of a pipe, inserting a plug of a highly compressible and highly absorbent wood in said socket with a bonding medium interposed between said plug and the wall of said socket, the outside diameter of said plug being oversize as compared with the inside diameter of said socket whereby the material of said plug will be placed under compression, allowing said bonding medium to set, removing the material of said plug to form an opening of a diameter to allow a thin veneer stratum of the material of said plug lining said socket opening, and providing the bit of the pipe with a tenon, the outside diameter of which is oversize as compared with the inside diameter of said veneer stratum.

2. The herein described method of making a smoking pipe consisting in forming a socket opening in the end of the shank of a pipe, inserting a plug of a highly compressible and highly absorbent wood in said socket with a bonding medium interposed between said plug and the wall of said socket, the outside diameter of said plug being oversize as compared with the inside diameter of said socket whereby the material of said plug will be placed under compression, allowing said bonding medium to set, drilling a small opening through said plug centrally thereof, drilling a larger opening through the material of said plug using said first named opening as a center guide for the drill to form an opening of a diameter to allow a thin veneer stratum of the material of said plug lining said socket opening, and providing the bit of the pipe with a tenon, the outside diameter of which is oversize as compared with the inside diameter of said veneer stratum.

3. The herein described method of making a smoking pipe consisting in forming a socket opening in the end of the shank of a pipe, inserting a plug of balsa wood in said socket with a bonding medium interposed between said plug and the wall of said socket, the outside diameter of said plug being oversize as compared with the inside diameter of said socket whereby the material of said plug will be placed under compression, allowing said bonding medium to set, removing the material of said plug to form an opening of a diameter to allow a thin veneer stratum of the material of said plug lining said socket opening, and providing the bit of the pipe with a tenon, the outside diameter of which is oversize as compared with the inside diameter of said veneer stratum.

4. The herein described method of making a smoking pipe consisting in forming a socket opening in the end of the shank of a pipe, inserting a plug of balsa wood in said socket with a bonding medium interposed between said plug and the wall of said socket, the outside diameter of said plug being oversize as compared with the inside diameter of said socket whereby the material of said plug will be placed under compression, allowing said bonding medium to set, drilling a small opening through said plug centrally thereof, drilling a larger opening through the material of said plug using said first named opening as a center guide for the drill to form an opening of a diameter to allow a thin veneer stratum of the material of said plug lining said socket opening, and providing the bit of the pipe with a tenon, the outside diameter of which is oversize as compared with the inside diameter of said veneer stratum.

5. The herein described method of making a smoking pipe consisting in forming a socket opening in the end of the shank of a pipe, inserting a plug of a highly compressible and highly absorbent wood in said socket with a water insoluble bonding medium interposed between said plug and the wall of said socket, the outside diameter of said plug being oversize as compared with the inside diameter of said socket whereby the material of said plug will be placed under compression, allowing said bonding medium to set, removing the material of said plug to form an opening of a diameter to allow a thin veneer stratum of the material of said plug lining said socket opening, and providing the bit of the pipe with a tenon, the outside diameter of which is oversize as compared with the inside diameter of said veneer stratum.

6. The herein described method of making a smoking pipe consisting in forming a socket opening in the end of the shank of a pipe, inserting a plug of balsa wood in said socket with a water insoluble bonding medium interposed between said plug and the wall of said socket, the outside diameter of said plug being oversize as compared with the inside diameter of said socket whereby the material of said plug will be placed under compression, allowing said bonding medium to set, removing the material of said plug to form an opening of a diameter to allow a thin veneer stratum of the material of said plug lining said socket opening, and providing the bit of the pipe with a tenon, the outside diameter of which is oversize as compared with the inside diameter of said veneer stratum.

DAVID P. LAVIETES.